G. J. BEHRINGER.
SANDPAPERING MACHINE.
APPLICATION FILED JAN. 3, 1917.
1,228,520.
Patented June 5, 1917.
2 SHEETS—SHEET 1.
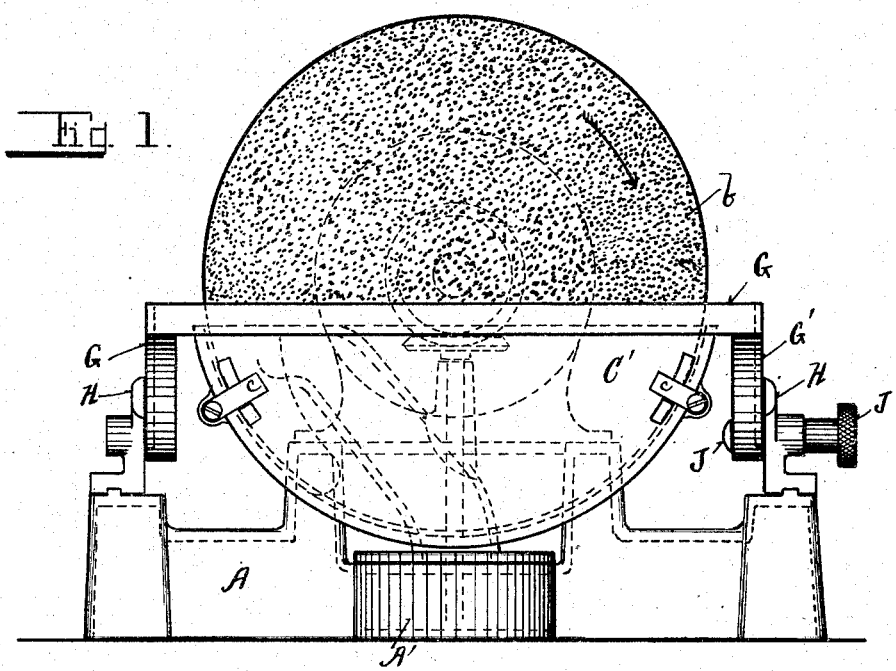
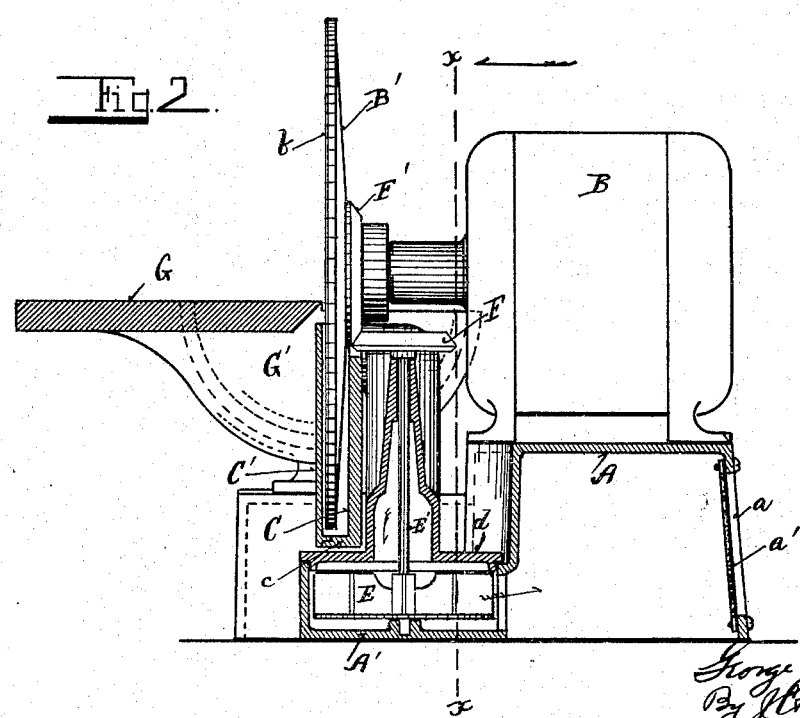
Inventor.
George J. Behringer G. J. BEHRINGER.
SANDPAPERING MACHINE.
APPLICATION FILED JAN. 3, 1917.
1,228,520.
Patented June 5, 1917.
2 SHEETS—SHEET 2.
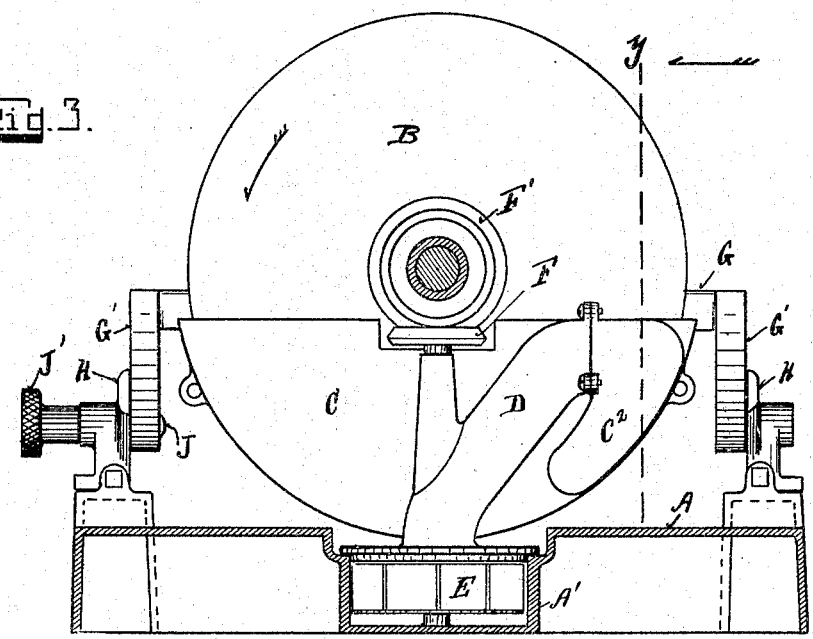
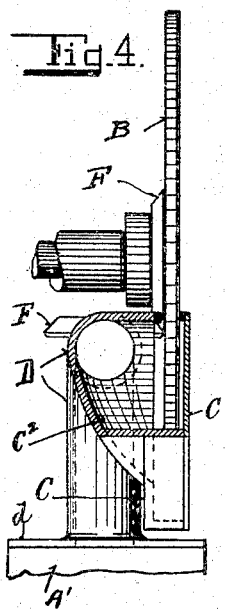
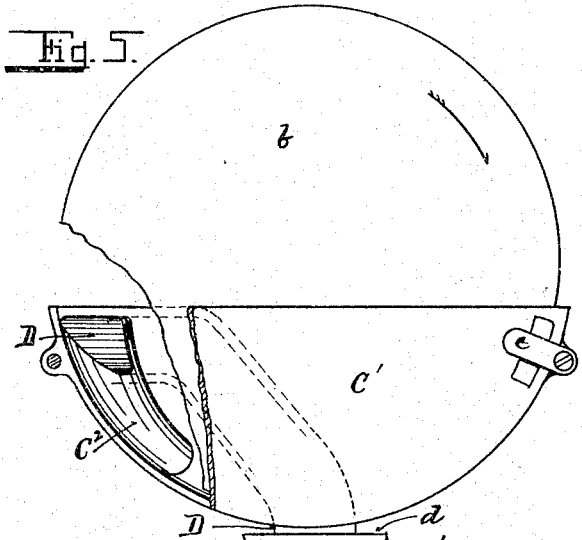
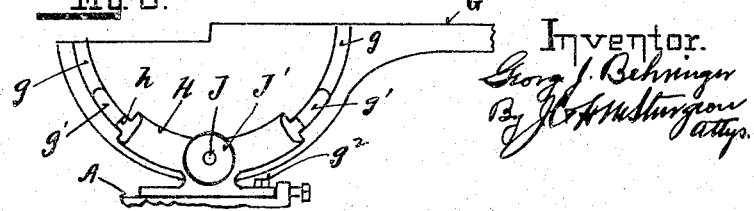

UNITED STATES PATENT OFFICE.

GEORGE J. BEHRINGER, OF ERIE, PENNSYLVANIA.

SANDPAPERING-MACHINE.

1,228,520.  Specification of Letters Patent.  Patented June 5, 1917.

Application filed January 3, 1917. Serial No. 140,451.

*To all whom it may concern:*

Be it known that I, GEORGE J. BEHRINGER, a citizen of the United States, residing at Erie, in the county of Erie and State of Pennsylvania, have invented certain new and useful Improvements in Sandpapering-Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to sand-papering machines, and particularly to that type known as disk-sanders, and has for its object the provision of suitable mechanism to draw the wood-dust away from the sand-disk and deposit the same in a suitable receptacle.

The features of my invention will appear hereinafter in the specification and claims, and are illustrated in the accompanying drawings in which:—

Figure 1, is a front elevation of a sand-papering machine embodying by invention.

Fig. 2, is a side elevation of the same, partially in central section.

Fig. 3, is a transverse section of the same on the line $x-x$ in Fig. 2, looking in the direction of the arrow.

Fig. 4, is a fragmentary view on the line $y$ in Fig. 3, looking in the direction of the arrow.

Fig. 5, is a front fragmentary view with portions broken away.

Fig. 6, is a fragmentary end view thereof.

In these drawings A indicates a base-plate which is cored out at its under side, as shown in Figs. 2 and 3, and is provided with a circular fan-drum A′ which has a discharge opening into the interior cavity of said base-plate. This base-plate also is provided with an opening $a$ in one of the walls thereof, which opening is provided with a screen $a'$. Upon the base A is placed a motor B, upon the spindle of which is secured a disk B′, upon which sand-paper $b$ is secured. The disk B′ may be mounted upon the base A and provided with any form of driving mechanism desired, but I prefer to use a motor as shown in the drawings.

The lower portion of the periphery of the disk B′ is inclosed in a hollow case composed of a rear-plate C, provided with a flange $c$, and a removable front-plate C′, which is secured in place by means of latches $c$ $c$ (see Figs. 1 and 5) so that the same may be removed when desired.

The back-plate C is provided with a trough-like groove $C^2$, the upper end of which terminates in a dust-duct D (see Figs. 4 and 5), which leads to the fan-drum A′ in the frame A. Within the drum A′, I place an exhaust fan E, of usual construction, which is driven by means of a vertical shaft E′, on the upper end of which is a miter friction wheel F which engages a miter friction wheel F′ on the back of the disk B′. The fan-drum A′, is open at its upper side, and is covered by means of a disk $d$ to which the lower end of the dust-duct D is secured. G indicates a rest-plate upon which to place the work which it is desired to sand-paper. This rest-plate G is provided with semi-circular ears G′, the outer faces of which are provided with semi-circular slots $g$ (see Fig. 6) a portion of which slots are cut entirely through the ears G′, as shown at $g'$ in said figure.

Adjustably secured upon the base-plate A by means of a bolt $g^2$ are brackets H H, which are provided with segmental ribs $h$, which fit into the slots $g$, of the ears G′, so that when it is desired to adjust the angle of the rest-plate G with relation to the face of the sand-disk B′, the ears G′, will slide upon the ribs $h$. The ears G′, are secured from sliding upon the brackets H by means of a bolt J which passes through the slot $g'$, and by the hand-nut J′, so that by means of said bolt J, and hand-nut J′, the rest-plate may be loosened, adjusted, and then secured in any position required.

In operation the miter friction wheels F and F′, cause the fan E to rotate, which exhausts air from the dust-duct D, which causes air to rush into the duct D from the casing C—C′, which carries any wood-dust, which is carried into said casing into said duct D, and thence through the fan-drum into the interior of the base-plate A. The air escapes through the screen $a'$, in the opening $a$, the dust remaining in the base-plate.

Having thus described and illustrated my invention so as to enable others to construct and utilize the same, what I claim as new and desire to secure by Letters-Patent is:—

1. In a machine of the class described, a hollow base-plate, a horizontal fan-drum having a discharge opening into said hollow base-plate, a horizontal shaft mounted on said base-plate above said fan-drum, a disk on said shaft, a plate to close the upper end of said fan-drum, an air duct secured to said fan-drum covering-plate, a vertical shaft in said air duct and supported in suitable bearings on said air-duct, a friction wheel on the upper end of said vertical shaft and engaging the rear side of said disk, a fan on said vertical shaft within said drum, a semi-circular plate supported by said air-duct and having an opening therethrough into said air-duct, a flange around the semi-circular edge of said plate, and a semi-circular plate adapted to fit into said flange in front of said disk, substantially as set forth.

2. In a machine of the class described, a horizontal fan-drum, a plate to cover the upper end of said drum, a disk, a semi-circular shield inclosing the lower portion of said disk and having a segmental groove in the rear wall thereof behind said disk at the corner thereof adjacent to the upwardly moving edge of said disk, an air-duct leading from said segmental groove through the central portion of said fan-drum cover and supporting said semi-circular shield, a fan in said drum, a shaft secured to said fan and extending upwardly through a portion of said air-duct, a friction-wheel on said shaft engaging the rear side of said disk, substantially as set forth.

In testimony whereof I affix my signature.

GEORGE J. BEHRINGER.

Copies of this patent may be obtained for five cents each, by addressing the "Commissioner of Patents, Washington, D. C."